United States Patent [19]

Haas

[11] Patent Number: 4,707,618

[45] Date of Patent: Nov. 17, 1987

[54] SWITCH PROTECTION MECHANISM

[76] Inventor: Richard M. Haas, 3452 N. 47th St., Phoenix, Ariz. 85018

[21] Appl. No.: 869,620

[22] Filed: Jun. 2, 1986

[51] Int. Cl.$^4$ .............................................. H02J 9/00
[52] U.S. Cl. ....................................... 307/64; 307/85; 307/87; 361/92; 363/98
[58] Field of Search ........................ 307/64, 66, 85, 86, 307/87; 361/89, 90, 91, 92, 93; 363/97, 98, 131, 132

[56] References Cited

U.S. PATENT DOCUMENTS

| | | | |
|---|---|---|---|
| 3,229,111 | 1/1966 | Schumacher et al. | 307/64 |
| 3,337,743 | 8/1967 | Rolfes | 307/87 X |
| 3,351,770 | 11/1967 | O'Sullivan | 307/64 |
| 3,389,268 | 6/1968 | Jamieson et al. | 307/87 X |
| 3,509,357 | 11/1970 | Studtmann | 367/64 |
| 3,971,957 | 7/1976 | Hase | 307/64 |
| 3,991,319 | 11/1976 | Seruos et al. | 307/64 |
| 4,010,381 | 3/1977 | Frickenscher et al. | 307/66 |
| 4,104,539 | 8/1978 | Hase | 307/64 |
| 4,115,704 | 9/1978 | Hannemann | 307/64 |
| 4,195,233 | 3/1980 | Udvardi-Lakos | 307/66 |
| 4,238,691 | 12/1980 | Ebert | 307/66 |
| 4,241,261 | 12/1980 | Ebert | 307/45 |
| 4,310,771 | 1/1982 | Wyatt | 307/64 |
| 4,313,060 | 1/1982 | Fickenscher et al. | 307/66 X |
| 4,327,298 | 4/1982 | Burgin | 307/66 |
| 4,381,457 | 4/1983 | Wiles | 307/64 |
| 4,400,625 | 8/1983 | Hussey | 307/66 |
| 4,417,152 | 11/1983 | Fleischmann | 307/64 |
| 4,460,834 | 7/1984 | Gottfried | 307/64 |
| 4,473,756 | 9/1984 | Brigden et al. | 307/66 |
| 4,510,401 | 4/1985 | Legoult | 307/66 |
| 4,516,035 | 5/1985 | Rhoads et al. | 307/66 |
| 4,517,470 | 5/1985 | Cheffer | 307/82 X |
| 4,553,039 | 11/1985 | Stifter | 307/66 |
| 4,556,802 | 12/1985 | Harada et al. | 307/87 X |
| 4,586,119 | 4/1986 | Sutton | 363/98 X |
| 4,604,530 | 8/1986 | Shibuya | 307/66 |

FOREIGN PATENT DOCUMENTS 2160722 12/1985 United Kingdom .................. 307/66

Primary Examiner—William M. Shoop, Jr.
Assistant Examiner—Shik Luen Paul Ip
Attorney, Agent, or Firm—Lahive & Cockfield

[57] ABSTRACT

A continuous power source operating as an uninterruptible power supply functions as an on-line power management device for output loads such as computers. During normal power flow operation, alternating current power passes from a conventional AC line power input through a power line filter and a power monitor and phase shift circuit to output terminals coupled to the load. The power monitor circuitry provides control signals for synchronizing the frequency and phase of a sine wave generator, the output of which is coupled to a normally inoperative static inverter as the control signal for controlling the frequency and phase of operation of such static inverter. The output of the static inverter is coupled to the load terminals through a transformer. If the voltage of the line alternating current signal falls outside a predetermined window, the power monitor switches off power from the line to the load terminals and enables the static inverter for operation. The switch-over is nearly instantaneous and occurs within the time delay of the phase shift circuit; so that essentially no detectable difference is discernable at the output load terminals during and after a switchover from the primary power source to the altenate power source and vice-versa.

18 Claims, 2 Drawing Figures

SWITCH PROTECTION MECHANISM

BACKGROUND

Electronic computing equipment currently is widely used in a variety of business activities. Businesses of all sizes are becoming increasingly dependent on computers for word processing, data processing, bookkeeping, and specialized computing applications. Computers are being used in homes to perform organizational and bookkeeping tasks. In addition, computers increasingly are being used in schools from the university level down into grade schools. The potential of electronic computers for performing data handling and data gathering tasks still is in its infancy, and the growth in the applications and extent of use of computers is explosive. Electronic computers increasingly are becoming a necessity in the performance of the day-to-day operations of business, medical facilities, schools, and homes. There is a continuous increasing demand for accuracy and reliability in the operation of these machines.

Computers or electronic data processing systems all incorporate relatively large volume memories for storing information and data. Basically, these memories fall into two different categories: namely, (1) electro-magnetic devices such as tapes, discs, bubbles, et cetera; and (2) electronic memory devices, such as RAM (random access or read and write memory) and ROM (read only memory). Electro-magnetic memory devices are non-volatile, that is, they retain data without the necessity of the presence of electric power. Once data is stored in these memories it remains stored indefinitely until such time as it may be intentionally changed. ROM memories also are non-volatile, but these memories cannot accept new information once they have been programmed. ROM memories perform pre-established special functions in the operations of computers or electronic data processing equipment.

RAM memories, which are used in all computing data processing and word processing systems, are volatile, that is, such RAM memories lose all data stored in them whenever electric power is interrupted. These RAM memories constitute the variable storage memories used in computers during the operation or processing of data, or in the creation of documents, such as letters and the like through word processors, et cetera. If electric power is interrupted or power surges cause temporary malfunction of the information in an RAM memory, all data which is being temporarily stored in such a memory can be lost or, equally as serious, errors can be introduced into the stored information without the knowledge of the operator. Consequently, it is becoming increasingly important to protect electronic computing equipment, data processors, or word processors, from total and temporary power losses and from even momentary power surges or interruptions.

A number of prior art devices have been developed for protecting the RAM memories of electronic computing equipment from power failures. In most of these systems, back-up power is provided by means of a rechargeable battery or a bank of rechargeable batteries. The most direct method is to incorporate such a battery or batteries directly into the operating system, that is to operate the system from the batteries and use the power source to maintain the battery charge. Systems of this type constitute what have become known as uninterruptible power supplied (UPS), which generally consist of a continuously-operating electronic power converter, a rechargeable battery supplying power to the converter, and a battery charger connected to the line for providing charging current to the battery. Although UPS systems offer continuous output, such systems generally are large, heavy, and expensive.

A second type of power back-up system is a standby power supply (SPS). SPS systems generally consist of a static inverter operated only when the main alternating current line power supply fails. A rechargeable battery for supplying operating power to the inverter is connected through a battery charger to the alternating current signal line, and a relay switch circuit is used to disconnect the main alternating current supply and to connect the inverter output to the electronic equipment whenever there is a power supply failure. SPS systems provide power backup with a short interruption for the switch-over. This short interruption, however, is not acceptable for some systems, even though SPS devices generally are small and economical.

Because of the small size and relatively low cost, SPS systems are preferred if the load for which such systems provide power backup can function with or tolerate the brief interruptions or abrupt phase shifts which occur when the backup system switches in or takes over from the primary system and vice-versa. A patent disclosing such a system is Servos U.S. Pat. No. 3,991,319. The Servos system is a stand-by power supply system which normally supplies power from a conventional alternating current (AC) power source to a load. A line switch is included between the AC source and the load. In addition, there is a stand-by direct current/inverter system for providing power to the load in the event there is a drop in the AC power supply or in the event such power supply is interrupted. An oscillator in the auxiliary supply is synchronized with the primary AC power. The synchronization of this oscillator is maintained during the supply of power from the AC source and it is reestablished when the AC power returns after a period of interruption. This synchronization reduces the chances of abrupt phase shifts occurring in the signal being supplied to the load whenever the power supply is switched from the main supply to the auxiliary supply, and vice-versa. The inverter in the auxiliary supply of Servos operates continuously; and a phase detector, supplied with the output of the inverter and the signal on the main alternating current supply continuously compares the two signals in phase. The phase detector produces a control signal coupled to the inverter to cause the inverter output to be in a lagging phase relationship with the primary alternating current signal. The output of the inverter and the primary alternating current signal are always connected in parallel to the output regulator which furnishes alternating current power to a load. Since the primary alternating current source is in a leading phase relationship under normal conditions of operation, the load power normally is drawn nearly entirely from the primary alternating current source. Whenever the line voltage of the primary alternating current source drops below some preestablished value, however, the output of the system then automatically is supplied from the continuously operating inverter. Because of the lagging phase relationship, a phase shift is produced at the load.

Another system for providing nearly continuous alternating current power to a load is disclosed in the Hase U.S. Pat. No. 3,971,957. This patent discloses an electrical load transfer control system, the normal operating condition for which is by way of an inverter from a "float-charged" battery. The battery is constantly charged from the main alternating current supply. The battery then supplies power to the inverter which, in turn, supplies operating power to the load through a normally closed switch. Thus, this system is a type of UPS system. If there is a failure of the inverter of Hase, a fault detector circuit senses this condition and closes a switch from the main or household alternating current supply to the load, and opens the switch from the inverter. There is an intentional overlap between the switch closings and openings, but the switch-over is not necessarily entirely without any gaps or glitches.

Another patent for transferring alternating current operating power to a load between first and second sources is Studtmann U.S. Pat. No. 3,509,357. This patent is directed to a static transfer switching system having a first normally-used inverter (for producing alternating current power to a load) and a second stand-by inverter. A first switch is selectively operable to couple the normally-used source to the load; and a second switch is selectively operable to couple the stand-by source to the load. An alternating current reference signal, corresponding in wave-shape to the first source signal, is compared to the first source signal. An error signal is produced if the amplitudes of the first source and reference signals fail to correspond. This error signal then is used to effect operation of the first and second switches to connect the stand-by source to the load and disconnect the normally-used source from the load. Studtmann states that this switching takes place "substantially instantaneously". Both sources are continuously operating; and power is not supplied to the load from a standard alternating current line power supply.

It is desirable to provide a reliable and relatively low cost continuous power supply or continuous power source having the characteristics of the prior art uninterruptible power supplies (UPS) without the disadvantageous of the cost, weight, and bulk of UPS systems. It further is desirable to provide a power control or power switching circuit which does not include the abrupt phase shifts or momentary gaps typically caused at switch over from prior art stand-by supplies (SPS).

SUMMARY OF THE INVENTION

Accordingly it is an object of this invention to provide an improved power control circuit.

It is another object of this invention to provide an improved power back-up circuit for supplying uninterrupted power to a load in the event of failure or interruption of a main alternating current power supply.

It is an additional object of this invention to provide an improved continuous power source for supplying uninterrupted power to a load from an alternate energy source whenever the main alternating current power supply is interrupted or fails with the switch-over being undetectable at the load.

In accordance with the preferred embodiment of this invention, a system is provided for maintaining continuous flow of alternating current power to a load. A primary source of alternating current signal power, such as obtained from conventional alternating current lines, is normally connected through a normally closed switch and a phase shift circuit to the load. A normally non-operating alternate source of alternating current signal power also is connected to the load terminals. A control circuit is coupled to the primary source of alternating current signal power and has an output coupled with the alternate source of alternating current signal power for producing an alternating current control signal applied to a control input of the alternating current source for controlling the operation of the alternate alternating current source. This control signal is synchronized in frequency and phase with the frequency and phase of the alternating current power from the primary signal source. The signals on the primary source of alternating current signal power are constantly monitored; and whenever the voltage level of these signals is other than a pre-determined range of voltages, the normally closed switch is opened and the alternate source is turned on prior to the time the signal variation can pass through the phase shift circuit to the load.

DETAILED DESCRIPTION

Figure 1:
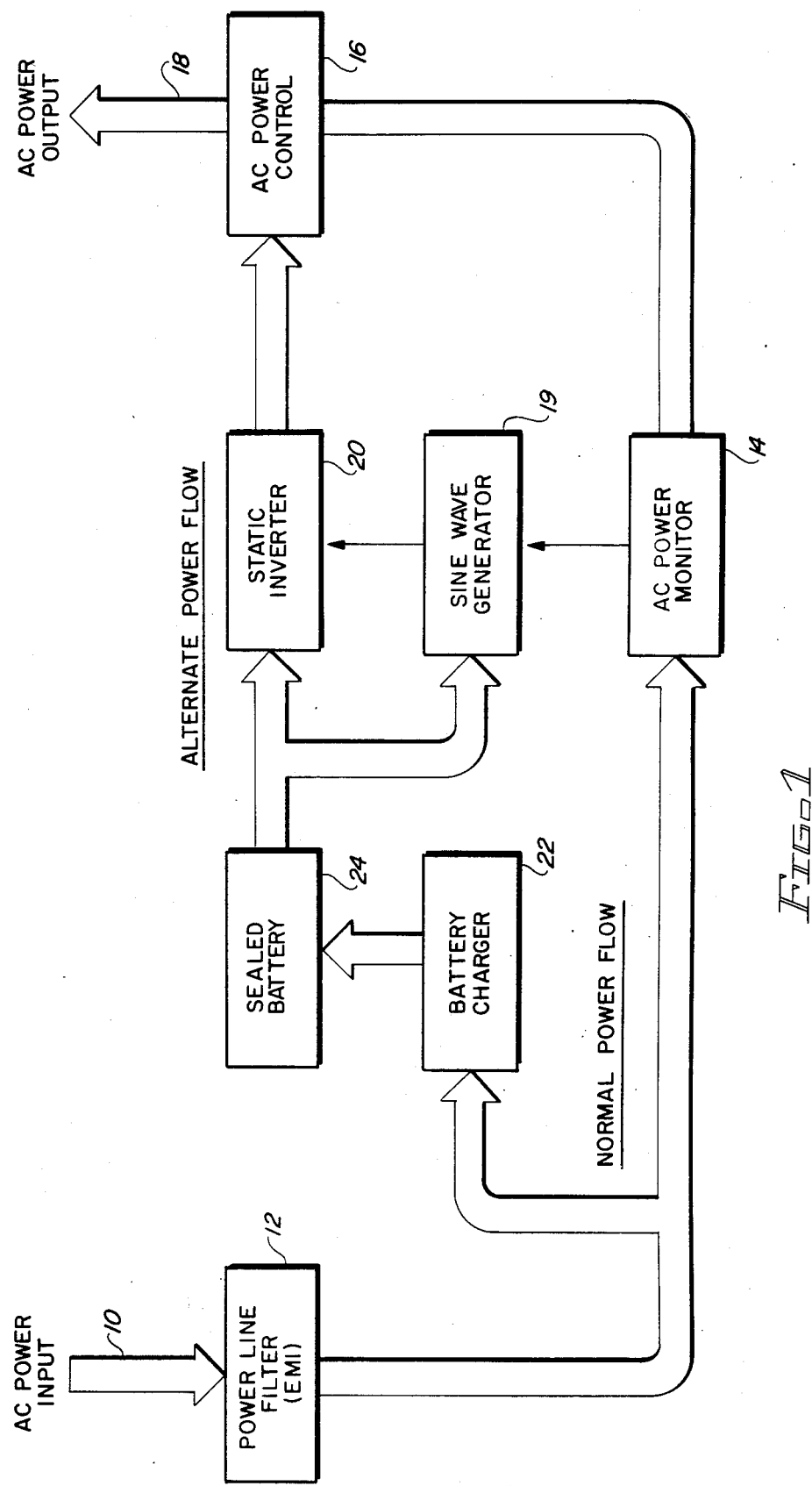
FIG. 1 is a block diagram of the system configuration of the preferred embodiment of the invention.

Reference now should be made to the drawings in which the same reference numbers are used in both Figures to designate the same or similar components. FIG. 1 is a functional block diagram of a preferred embodiment of the invention. The primary power supply is obtained from a source of line alternating current signal power 10, which is applied through a power line filter (EMI) 12. The filter 12 is utilized to prevent electrical noise and voltage spikes from passing through the power input lines into the remainder of the system and also to isolate any switching noise (occurring through operation of the system) from the source AC line connected at 10.

The normal power flow is from the AC power input 10 through the filter 12 and through an alternating current power monitor 14 to an alternating power control circuit 16 to load output terminals 18. The power control circuit 16 includes a normally-closed switch interconnecting the output of the power monitor 14 with the load at 18.

The alternating current power monitor 14 supplies a synchronization signal (synchronized in frequency and phase with the frequency and phase of the power supplied on the input 10) to a sine wave generator 19. The sine wave generator 19 operates at a nominal 60 Hz frequency which may be varied ±3 Hz, so that the output of the generator 19 tracks the phase and frequency of the input signal at 10. The output of the generator 19 is applied to control inputs of a normally inoperative static inverter 20 to synchronize the operation of the static inverter 20 with the generator 19 whenever the inverter 20 is enabled for operation.

Power for operating the static inverter 20 and the sine wave generator 19 is obtained from a sealed battery 24, typically consisting of sealed lead/acid rechargeable batteries. Charging current for the batteries 24 is obtained from a battery charger 22 supplied with operating power from AC line current appearing on the output of the filter 12.

At such time as the alternating power monitor circuit 14 detects a deviation in the alternating current signal from the design specifications of the system, the static inverter 20 is enabled for operation. The switch in the power control circuit 16 also is opened to permit the alternating current signal supplied to the output 18 to be obtained from the static inverter 20 instead of from the line alternating current power input at 10. A phase shift (time delay) for the signals from the input 10 passing through the filter 12 is also provided by the control circuit 16; so that the switch-over to the alternate power provided by the inverter 20 (which takes place in 100 microseconds or less) occurs before the signal deviation reaches the power control circuit switch in 16. The result is a smooth, steady continuous supply of alternating current power to the output 18 without any detectable phase shift or without any even slight interruptions. As seen from a load connected to the output 18, the system functions in the manner of the much more cumbersome UPS systems.

Figure 2:
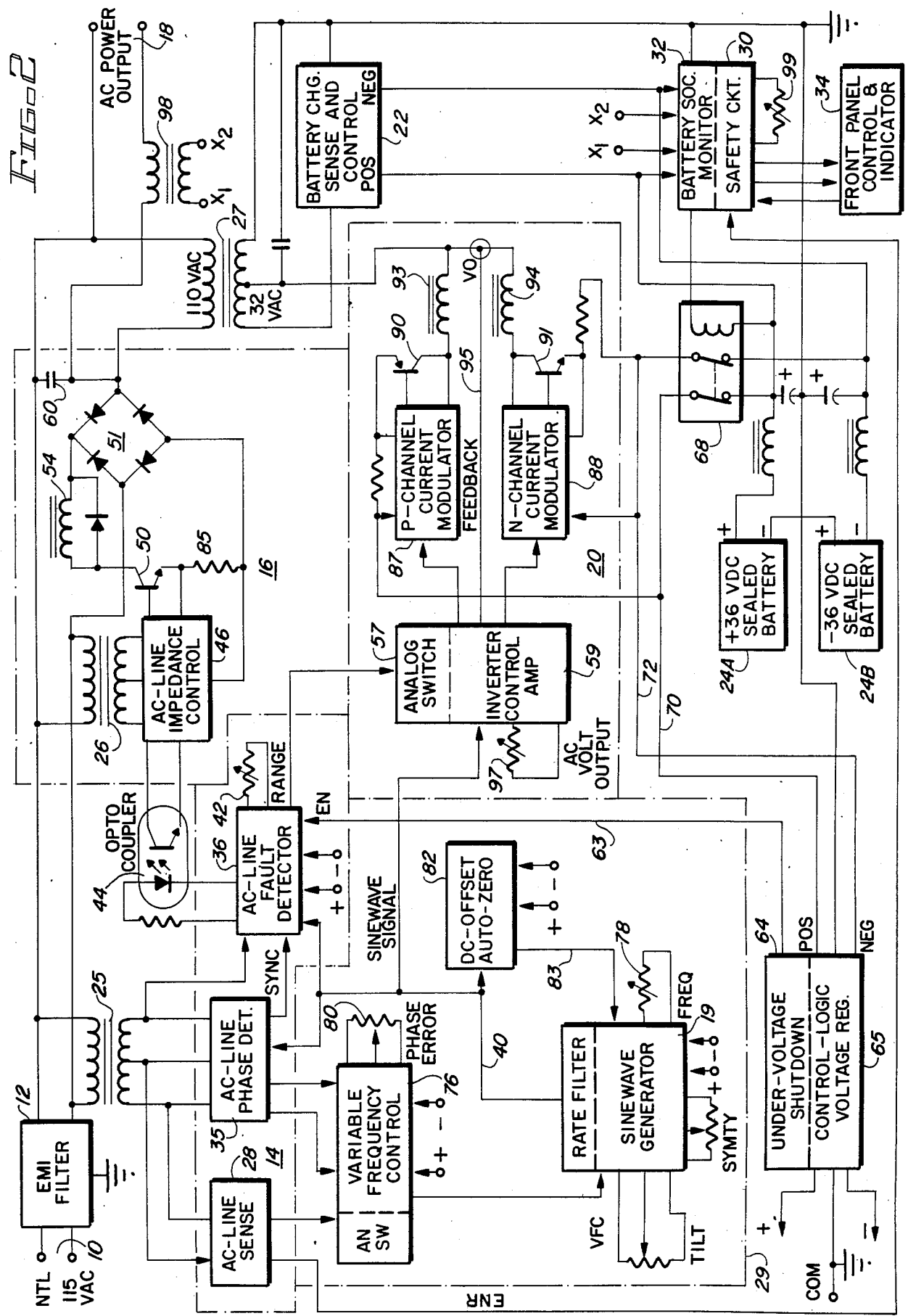
FIG. 2 is a detailed schematic diagram of the system shown in FIG. 1.

Reference now should be made to FIG. 2 which illustrates a preferred embodiment of the invention in considerably more detail than the block diagram of FIG. 1. Under normal conditions of operation, power is supplied from the alternating current line 10 through the filter 12 and the AC power control 16 to the AC power output terminals 18 which are identified with the same reference numbers in FIG. 2 as in FIG. 1. This input alternating current is not altered except to filter it by the filter 12 and to provide current limiting as necessary. As mentioned above, however, it is necessary that the input alternating current voltage must remain within a pre-established voltage range (105 volts to 125 volts, for example) or the unit is transferred to its alternate internal operating mode. In addition, since the alternate internal source of alternating current power is battery operated, the batteries (24A and 24B) must be installed and operational for the unit to function in its alternate mode.

To provide the necessary monitoring of the normal or primary alternating current power, three transformers 25, 26, and 27 are provided. The primary windings of each of these three transformers are connected across the output terminals of the filter 12. The transformer 25 supplies operating signals to the AC power monitor circuit 14, the transformer 26 is incorporated as part of the AC power control switching circuit 16, and the transformer 27 serves as a part of the AC power control to provide power from the alternate source of internal alternating current power when that source is active. In addition, the transformer 27 functions to provide alternating power current to a battery charging, sensing, and control unit 22 which includes internal rectifiers for providing the necessary positive and negative charges for maintaining the charges on the +36 volt sealed battery 24A and the −36 volt sealed battery 24B, respectively.

During normal operation, the presence of the primary alternating current power from the output of the filter 12 is sensed by the transformer 25 and applied through the secondary winding of that transformer to an AC line sense circuit 28, which detects the presence of the input alternating current from the low voltage side of the transformer 25. The circuit 28 produces an output signal on the lead 29 ENR when the input alternating current signal reaches and exceeds 105 volts. The signal on the lead 29 is applied to a safety circuit 30 which is a part of a battery state of charge monitoring circuit 32. The safety circuit 30 monitors this ENR signal; and unless a control switch of the control panel 34 of the unit is in the correct position, the unit will not start operation if the input alternating current line voltage is less than 105 volts. In addition, the safety circuit 30 produces a signal for providing an audible alarm (not shown) in the unit to warn of low battery voltage (as determined by the battery monitoring portion 32) or if the charging circuits 22 are not operating. If the unit is operating in its alternate internal power flow mode, the alarm also is sounded approximately two minutes before shutdown occurs because of low battery voltage.

Additional outputs are applied from the low voltage secondary winding of the transformer 25 to an alternating current line phase detector circuit 35 and an alternating current fault detector circuit 36. The fault detector 36 continuously monitors and compares the input alternating current signal voltage level to the alternating current signal voltage level generated by the internal sine wave generator 19. The output of the sine wave generator 19 is applied over a lead 40 to inputs of both the AC line phase detector 35 and the AC line fault detector circuit 36. The sine wave generator 19 continuously operates during all modes of operation of the unit whether it is supplying the AC power output to the terminals 18 from the primary power source at the input 10 or from the alternate internal static inverter power source 20.

The two signals applied to the AC line fault detector 36 are compared by causing one signal to be 180° out of phase with the other and then summing these two signals together. Obviously, when the signals are of the same amplitude and are exactly in phase, the summing amplifier output is zero. This signal is then fed to a window comparator within the AC line fault detector, the window of which is set by a range potentiometer 42. The potentiometer 42 initially is adjusted in the set-up of the system to cause the window comparator tripping points to be set at 105 volts and 125 volts (as typical low and high voltages for the range). A trip signal is produced from the comparator to turn off the current path from the output of the filter 12 to the AC power output terminals 18 whenever the primary alternating current voltage signal from the terminals, 10 appearing on the output terminals of the filter 12, is below or above the window range of the window comparator. This is done through an optical coupler switch 44 controlled by the output of the AC line fault detector 36. The switch 44 operates an alternating current line impedance control circuit 46 to turn off a normally-conducting switching transistor 50, connected in series circuit through a rectifier bridge 51 and an inductor 54 with the alternating current signals passing from the filter 12 to the output terminal 18.

Simultaneously, a signal also is applied from the output of the line fault detector 36 over a lead 55 to an analog switch 57. This signal enables an inverter control amplifier 59 in the static inverter section 20 to turn on the static inverter 20; so that it may then supply the alternate alternating current signal power from the inverter through the transformer 27 to the output terminals 18. This transfer of power flow occurs in less than 100 microseconds. The construction of the transformer 27 is such that it incorporates a significant amount of inductive leakage. This leakage, along with the storage capacity of the output filter capacitor 60, provides sufficient energy to support the output load while the unit transfers between its normal and alternate operating modes.

Since many systems which may be attached as loads to the output terminals 18 cannot tolerate even a 100 microsecond interruption in the power supplied to them, provision must be made to eliminate even this short an interruption. The inductor 54 and a capacitor 60, connected across the output terminals 18, together form an LC filter which phase shifts the output signal in reference to the signal appearing on the input terminals 10 to provide a slight time delay to the signal. This time delay exceeds this 100 microsecond switch-over time. As a result of the phase shift provided by the inductor 54 and capacitor 60, it is possible to detect an input power disturbance and cause the control circuits of the system to switch off the normal power flow and switch on the alternate internal power supply completely within the 100 microsecond switch-over time before the disturbance can propagate through the filter 12 and reach the output 18.

The alternating current line fault detector 36 also receives an under-voltage signal over lead 63 from an under-voltage shutdown portion 64 of a control logic voltage regulator 65 to disable both the normal AC line power flow and the alternate inverter power operation whenever low logic and low battery voltage is present. The control logic voltage regulator 65 is supplied with the positive and negative battery voltage from the batteries 24A and 24B through a normally-closed relay switch 68 over a pair of leads 70 and 72, respectively. So long as there is sufficient charge on the battery, the operating coil for the relay 68 is provided with operating current; and the normal condition of operation for the relay 68 is that it is closed. If however the batteries 24A and 24B are not present, or if insufficient battery voltage exists, the relay operating coil has insufficient power and the contacts open. This condition is detected by the control logic voltage regulator 65 to produce the under-voltage shutdown signal to disable all of the circuits of the system.

It also should be noted that the control logic voltage regulator 65 produces the positive and negative operating voltages for the various electronic circuits shown throughout FIG. 2.

The AC line fault detector 36 also is supplied with a synchronization signal over a lead 75 which synchronizes the transferring of the alternating current power supplied to the terminals 18 from the alternate mode of operating back to the normal power flow mode only at zero-crossing points of the alternating current line voltage applied to the terminals 10. This is discussed in greater detail subsequently.

The third circuit which receives signals from the secondary windings of the transformer 25 in the AC power monitor section 14 is the AC line phase detector 35. Portions of the operation of this detector have been explained previously, and one of the signals which is supplied from the detector 35 is the synchronization signal over the lead 75. In addition, the detector 35 compares the phase of the input alternating current signal after it passes through the filter 12 to the sine wave output appearing on the lead 40 from the sine wave generator 19. The circuit 35 generates two square wave outputs which are synchronized to the zero-crossing points of the AC signals on both inputs. The pulse width differences between the two square waves represent the phase error between the two alternating current input signals. The pulse signals then are fed to a variable frequency control circuit 76 which generates a VFC control voltage applied to the sine wave generator 19 to cause the internal alternating current signal generated by the sine wave generator 19 to track, in frequency and phase, the line alternating input signal applied to the terminal 10.

The sine wave generator 19 is a free-running oscillator to create the output sine wave, and it includes a rate filter circuit for improving the shape of the sine wave signal appearing on the output lead 40. The nominal frequency of the sine wave generator 19 is set by a control potentiometer 78 to be at a center frequency of 60 Hz. This is the frequency of oscillation of the generator 19 which it attains when the unit transfers to the alternate power flow mode of operation whenever there is an interruption of the normal alternating current power input on the terminal 10. Under this latter condition of operation, there is no input AC signal to use as a reference; and the free-running frequency of the sine wave generator 19 is the controlling frequency under the alternate power flow mode of operation.

Under normal conditions of operation, however, the frequency and phase of the sine wave generator 19 are slaved to the frequency and phase of the AC power input on the terminal 10. This is accomplished by the direct current signal VFC applied to the sine wave generator 19 to cause it to track the alternating current input signal on the terminal 10 within a range of ±3 Hz from a center frequency of 60 Hz. This synchronization is effected, so that the output alternating current from the static inverter section 20 is in phase with the alternating current signal at the terminals 10 whenever the unit transfers from its normal to its alternate mode of operation.

A phase error potentiometer 80 is used to provide a fine tuning adjustment to adjust the VFC signal to zero when the two signals compared by the line phase detector 35 are in phase as measured on an oscilloscope. This is another initial adjustment which is made to the system before placing it in operation. The VFC output signal from the variable frequency control circuit 76 is designed to slowly track any input AC signal frequency changes in order to prevent saturating of any power transformers which are connected to the alternating current output on the terminals 18. The variable frequency control circuit 76 is enabled by a signal from the alternating current line sense circuit 28; so that if no input or primary alternating current signal is present on the input terminals 10, the sine wave generator output signal operates at the nominal frequency set by the potentiometer 78 and is not affected by any signals from the output of the variable frequency control circuit 76.

To prevent saturation of the transformer 27 which would result in an improper alternating current output signal, any direct current (DC) offset in the alternating current signal from the sine wave generator 19 must be removed. This is accomplished by a DC offset autozero circuit 82 which produces a control signal back to the sine wave generator 19 over a lead 83. The circuit 82 is designed to reduce the DC offset which may be present at the output of the sine wave generator on the lead 40 to such a small value that this offset is insignificant to the proper operation of the system.

As mentioned previously, the transistor 50 controlled by the AC line impedance control circuit 46 which, in turn, is controlled by the optical coupler 44, is used to remove the normal input alternating current signal from the transformer 27 and also from the output terminals 18 when a line fault is detected, requiring substitution of the alternate internally generated alternating current signal for the normal alternating current signal. The base current of the transistor 50 is controlled from the AC line impedance control circuit 46, and the alternating current output is limited by sensing the current through a resistor 85. As mentioned previously, the inductor 54 and capacitor 60 form an LC filter which phase shifts the output alternating current signal in reference to the input alternating line signals on the terminals 10. The bridge rectifier circuit 51 is provided; so that current flow through the transistor 50 always is only in one direction, as established by the rectifier circuit 51. The transistor 50 normally is conducting. If, however, a fault is indicated, operation of the optical coupler 44 causes the transistor 50 to be rendered non-conductive thereby preventing application of any further signals appearing on the terminal 10 from being applied to the transformer 27 and the output terminals 18. To reestablish or reverse this operation, the optical coupler 44 is operated to reapply forward current bias to turn on the transistor 50 only when a zero-crossing point of the input alternating line current appearing on the terminals 10 occurs. This prevents any voltage or current spikes from showing up on the output 18 when the system is tranferring from the alternate power flow mode of operation to a normal power flow mode of operation.

When the transistor 50 is switched off to remove the normal alternating current source and substitute the internally generated alternate alternating current signal, the static inverter 20 is enabled for operation. As mentioned previously, the sine wave signal appearing on the output lead 40 from the sine wave generator always is applied to the input of the inverter control amplifier 59. Normally this amplifier 59 is inoperative. At the time, however, the AC line fault detector 36 turns off the primary source of alternating current power, the analog switch 57 is operated to turn on or enable the inverter control amplifier 59. Outputs from the inverter control amplifier 59 then are applied to a pair of P-channel and N-channel current modulators 87 and 88, respectively. The modulators 87 and 88 are alternately switched on and off to generate the positive and negative portions of the output AC signal, as controlled by the sine wave signal applied through the inverter control amplifier 59. The modulators 87 and 88 drive pair of push-pull output transistors 90 and 91, respectively; and the output from these transistors is applied through a corresponding pair of inductors 93 and 94 to the center tap of the low voltage winding of the transformer 27. When the system is in its alternate mode of operation, the windings of the transformer 27 are such that the lower winding shown in FIG. 2 becomes the primary winding and the upper winding becomes the secondary winding. This is the reverse of the function of the transformer 27 when the system is operated in its normal power flow mode of operation. The inductors 93 and 94 average the power through the transistors 90 and 91, so that a smooth sine wave signal is applied to the transformer 27. In addition, the construction of the transformer 27 and the output filter capacitor 60 further reduce switching ripple to an insignificant level at the output. The output signal VO is fed back to the inverter control amplifier over a lead 95 to force the output signal to become a very close approximation of the sine wave signal generated by the sine wave generator unit 19. An adjustment potentiometer 97 is provided on the inverter control amplifier 59 to establish the proper alternating current voltage output ultimately applied to the output terminals 18.

It also should be noted that the P-channel current modulator is supplied with +36 volts from the battery 24A through the relay 68, and the N-channel modulator is supplied with −36 volts from the battery 24B through the relay 68.

Both of the modulators 87 and 88 are based on current mode control design which causes the respective transistors 90 and 91 connected to the outputs of the modulators 87 and 88 to be turned on and off based on the command signal provided by the inverter control amplifier 59. This design permits the current and voltage to be out of phase; and therefore creates a sine wave output which can drive reactive loads, such as transformers and motors connected to the power output terminals 18.

An output current sensing transformer 98 is employed to sense current flow in the output to the terminals 18 and provides a signal through its output or secondary winding to the battery state of charge monitoring circuit 32. This signal is used to prevent the unit from operating in its alternate power flow mode whenever there is no load on the output. If there is no load, this is sensed by the battery state of charge monitor 32; and the monitor causes the operating current through the coil of the relay 68 to be removed. This opens the terminals of the relay and disconnects the batteries 24A and 24B from the circuit. The relay 68 also is turned off by the battery monitoring circuit 32 whenever the charging current from the battery charging sense and control circuit 22 exceeds a safe level, as well as when the batteries become discharged below a lower safe level. A potentiometer 99 connected to the safety circuit 30, and operating in conjunction with the monitor circuit 32, is used to adjust the limit voltages which cause the control relay 68 to be deactivated.

When power is reapplied to the terminal 10 and is within the normal operating voltages, after the system has been operating in its alternate mode of operation, it is desired to turn off the alternate mode of operation and reestablish the power applied to the output terminals 18 from the power supplied to the input terminal 10 through the filter 12. This is accomplished automatically and without any interruption whatsoever detectable at the output terminals 18. When power is resumed, the comparison of the signal from the sine wave generator 19 on the lead 40 with the signals on the line 10, as detected by the AC line detector circuit 35, once again resumes in the same manner as described previously. No switch-over, however, takes place at this point. Synchronization of the sine wave generator 19 is effected gradually until the sine wave generator 19 is brought into synchronization, by means of the VFC control signal from the variable frequency control circuit 76, in the manner described previously.

Once synchronization has been effected, this is detected by the AC line fault detector circuit 36 which then causes the optical coupler switch 44 to operate to switch on the AC line impedance control circuit 46 only at a zero-line signal line crossover point in the input signal applied to the terminals 10. Again, as mentioned previously, operation of the AC line fault detector 36 causes the analog switch 57 to turn off the inverter control amplifier 59 and therefore turn off the inverter circuit 20 simultaneously with the turning on of the transistor 50 by the AC line impedance control circuit 46. Since the zero-crossings of the internally generated signal and the signal appearing on the terminals 10 are in complete syncrhonization at this point, the substitution of the normal power flow for the alternate power flow mode of operation is fully effected without even a momentary phase shift or interruption appearing on the signal at the AC power output terminals 18.

It should be noted that the inductors 93 and 94 in conjunction with the capacitor 60, produce a phase shift or phase delay in the output signal from the inverter circuit 20 which is equal to the phase delay produced in the normal or primary alternating current power signal produced by the inductor 54 and capacitor 60, mentioned previously.

The foregoing description has been made in conjunction with a preferred embodiment of the invention. Various changes and modifications, however, will occur to those skilled in the art without departing from the true scope of the invention. For example, different types of switching circuits and control circuits may be employed without changing the basic system operation. Particular circuit components which have been utilized may be combined with one another or arranged in a different form, so long as the overall system functions in accordance with the principles utilized in the preferred embodiment.

I claim:

1. A system for maintaining continuous flow of power to a load including in combination:

output load terminals;

a primary source of alternating current signal power;

first phase shift means;

normally closed switch means;

means for connecting said normally closed switch means and said first phase shift means between said primary source of alternating current signal power and said load terminals;

an alternate source of alternating current signal power connected to said output load terminals, said alternate source being inoperative when said switch means is closed and being operative when said switch means is open;

control means having a synchronizing input coupled with said primary source of alternating current signal power and an output connected with said alternate source of alternating current signal power, said control means including continuously operative means for producing an alternating current control signal and for applying said control signal to said alternate source of alternating current signal power for controlling the phase and frequency of operation thereof, said control signal being synchronized in frequency and phase with the frequency and phase of the alternating current signal from said primary source of alternating current signal power; and sensing means coupled with said primary source of alternating current signal power for sensing the voltage level of signals therefrom and for opening said normally closed switch means to disconnect said primary source of power from said load terminals and for rendering said alternate source of alternating current signal power operable whenever the voltage level of signals from said primary source of alternating current signal power is outside a predetermined voltage range.

2. The combination according to claim 1 wherein said alternate source of alternating current signal power is an inverter.

3. The combination according to claim 2 wherein said control signal is a sine wave control signal.

4. The combination according to claim 3 wherein said control means comprises sine wave generator, the output of which comprises said control signal; an alternating current line phase detector having a pair of inputs and an output; and a variable frequency control circuit means, the output of which is coupled to said sine wave generator to control the frequency and phase thereof; and said alternating current line phase detector comprises comparator means coupled to receive signals on the respective inputs thereof from said sine wave generator and from said primary source of alternating current signal power to produce an output signal on the output thereof, such output being coupled with said variable frequency control circuit to adjust the output signal thereof.

5. The combination according to claim 4 wherein said alternate source of alternating current signal power comprises inverter circuit means operating in synchronism with the alternating current control signal from said control means.

6. The combination according to claim 5 wherein said inverter circuit means has a control input; and further including analog switch means coupled between the output of said sine wave generator and the control input of said inverter circuit means for normally preventing operation of said inverter circuit means; said analog switch means having an input coupled with said sensing means and rendered operative to initiate operation of said inverter circuit means under control of said sine wave signals whenever the voltage level of signals from said primary source of alternating current signal is outside said predetermined voltage range.

7. The combination according to claim 6 further including battery power supply means for operating at least said sine wave generator and said static inverter means.

8. The combination according to claim 7 further including battery charger means connected to said battery for charging said battery, said battery charger means further coupled with said primary source of alternating current signal power to derive charging current therefrom for said battery.

9. The combination according to claim 6 wherein said sensing means operates in response to resumption of the voltage level of signals from said primary source within said predetermined voltage range to cause said analog switch means to operate to terminate operation of said inverter circuit means and to cause said normally closed switch means to be reclosed in response to reestablishment of an in-phase relationship of said alternating current control signal and the alternating current signal from said primary source of alternating signal power; and means for effecting such switch-over only on the zero crossing points of the alternating signal from said primary source of alternating current signal power.

10. The combination according to claim 9 for monitoring current flow through said output load terminals for preventing operation of said alternate source of alternating current signal power when no load is connected to said output load terminals.

11. The combination according to claim 1 wherein said alternate source of alternating current signal power comprises inverter circuit means operating synchronism with the alternating current control signal from said control means.

12. The combination according to claim 11 wherein said inverter circuit means has a control input; and further including analog switch means coupled between the output of said control means and the control input of said inverter circuit means for normally preventing operation of said inverter circuit means; said analog switch means having an input coupled with said sensing means and rendered operative to initiate operation of said inverter circuit means under control of said control signals whenever the voltage level of signals from said primary source of alternating current signal is outside said predetermined voltage range.

13. The combination according to claim 12 wherein said sensing means operates in response to resumption of the voltage level of signals from said primary source within said predetermined voltage range to cause said analog switch means to operate to terminate operation of said inverter circuit means and to cause said normally closed switch means to be reclosed in response to reestablishment of an in-phase relationship of said alternating current control signal and the alternating current signal from said primary source of alternating signal power; and mean for effecting such switch-over only on the zero crossing points of the alternating signal from said primary source of alternating current signal power.

14. The combination according to claim 1 wherein said control means comprises a free running sine wave generator, the output of which comprises said control signal; an alternating current line phase detector having a pair of inputs and an output; and a variable frequency control circuit means, the output of which is connected to said sine wave generator to control the frequency and phase thereof; and said alternating current line phase detector comprises comparator means connected to receive signals on the respective inputs thereof from said sine wave generator and from said primary source of alternating current signal power to produce an output signal on the output thereof, such output being applied to with said variable frequency control circuit to adjust the output signal thereof.

15. The combination according to claim 14 wherein said alternate source of alternating current signal power comprises inverter circuit means operating in synchronism with the alternating current control signal from said control means.

16. The combination according to claim 15 wherein said inverter circuit means has a control input; and further including analog switch means connected between the output of said control means and the control input of said inverter circuit means for normally preventing operation of said inverter circuit means; said analog switch means having an input connected to said sensing means and rendered operative to initiate operation of said inverter circuit means under control of said control signals whenever the voltage level of signals from said primary source of alternating current signal is outside said predetermined voltage range.

17. The combination according to claim 16 wherein said sensing means operates in response to resumption of the voltage level of signals from said primary source within said predetermined voltage range to cause said analog switch means to operate to terminate operation of said inverter circuit means and to cause said normally closed switch means to be reclosed in response to reestablishment of an in-phase relationship of said alternating current control signal and the alternating current signal from said primary source of alternating signal power; and means for effecting such switch-over only on the zero crossing points of the alternating signal from said primary source of alternating current signal power.

18. The combination according to claim 1 for monitoring current flow through said output load terminals for preventing operation of said alternate source of alternating current signal power when no load is connected to said output load terminals.

* * * * *